United States Patent

Standish et al.

(10) Patent No.: US 7,806,209 B2
(45) Date of Patent: Oct. 5, 2010

(54) APPARATUS AND METHOD TO REDUCE VIBRATIONS ON A TRACKED WORK MACHINE

(75) Inventors: Michael R. Standish, Peoria, IL (US);
James M. Hollister, Raleigh, NC (US);
Margaret M. Lamb, Raleigh, NC (US);
Roy L. Maguire, Edelstein, IL (US);
Thomas E. Oertley, Peoria, IL (US);
Roger L. Recker, Dunlap, IL (US);
David F. Schaefer, Princeville, IL (US)

(73) Assignee: Caterpillar Inc, Peoria, IL (US)

( * ) Notice: Subject to any disclaimer, the term of this patent is extended or adjusted under 35 U.S.C. 154(b) by 395 days.

(21) Appl. No.: 11/328,568

(22) Filed: Jan. 10, 2006

(65) Prior Publication Data

US 2006/0158034 A1    Jul. 20, 2006

Related U.S. Application Data

(60) Provisional application No. 60/642,671, filed on Jan. 10, 2005.

(51) Int. Cl.
*B62D 55/00* (2006.01)

(52) U.S. Cl. .................. 180/9.5; 180/9.1; 180/9.52; 180/9.62; 180/9.64; 305/144; 305/139; 305/154; 305/143

(58) Field of Classification Search ............ 180/9.5, 180/9.1, 9.52, 9.62, 9.64; 305/144, 139, 305/154, 143
See application file for complete search history.

(56) References Cited

U.S. PATENT DOCUMENTS

| 3,659,669 | A | * | 5/1972 | Mazzarins | 180/9.5 |
| 4,422,696 | A | | 12/1983 | Seit | |
| 4,817,746 | A | * | 4/1989 | Purcell et al. | 180/9.1 |
| 5,913,374 | A | | 6/1999 | Becker et al. | |
| 6,024,183 | A | * | 2/2000 | Dietz et al. | 180/9.1 |
| 6,431,665 | B1 | | 8/2002 | Banerjee et al. | |
| 6,860,571 | B2 | * | 3/2005 | Scheetz | 305/143 |
| 7,226,137 | B2 | * | 6/2007 | Fornes | 305/143 |
| 2006/0028066 | A1 | * | 2/2006 | Yamamoto | 305/139 |
| 2006/0082218 | A1 | * | 4/2006 | Park et al. | 305/139 |

* cited by examiner

*Primary Examiner*—Lesley Morris
*Assistant Examiner*—Marlon A Arce

(57) ABSTRACT

An apparatus and method for reducing vibrational effects of track chain assembly catenary hang is disclosed. A work machine includes a pair of track roller assemblies one positioned on each side of the work machine. The vibration reducing apparatus and method includes repositioning undercarriage components to vary the catenary hang from one side of the work machine to the other.

15 Claims, 3 Drawing Sheets

APPARATUS AND METHOD TO REDUCE VIBRATIONS ON A TRACKED WORK MACHINE

This application claims the benefit of U.S. Provisional Application No. 60/642,671, filed Jan. 10, 2005.

TECHNICAL FIELD

This invention relates generally to an undercarriage arrangement for a track laying work machine and more particularly to an undercarriage that reduces the vibrational effects of a catenary hang of the track chain assembly on opposite sides of a work machine.

BACKGROUND

Work machines are supported and propelled by various arrangements such as wheels, tracks and belts. These support arrangements to a large extent determine the quality of ride of the work machine, the performance of the work machine and the noise that the machine emits during operation. For example, work machines such as track laying work machines are supported and propelled by track chains. The motion of the track chains as they wrap are undercarriage components such as sprockets, idlers, etc. create a clanking and jarring type of motion. While doing fine working operations this motion can cause flaws in finishing operations.

Specifically, when a track type dozer is performing fine dozing operations, vibrations can occur that are caused by the mechanical components due to the nature of the machine as well as the terrain being traversed. These vibrations come from many sources such as the contact of the track chain to the sprocket, idlers, mid-rollers and carrier roller. Another source is the vibration is associated with the catenary hang of a track chain assembly on one side of the work machine being in phase with the track chain on the opposite side.

The present invention is directed to overcoming one or more of the problems as set forth above.

SUMMARY OF THE INVENTION

In one aspect of the present invention an undercarriage arrangement includes a first track roller and a second track roller assembly. The first and second track roller assemblies each have a roller frame, a drive sprocket, at least one idler assembly rotatably connected to the roller frame, a carrier roller rotatably connected to an upper portion of the roller frame and a track chain entrained around the drive sprocket, the at least one idler assembly, and the carrier roller. The track chain defines a catenary hang. The catenary hang of the first roller assembly being different than the catenary hang of the second roller assembly.

In yet another aspect of the present invention a method of reducing vibrational effects of a first and a second track roller assembly of a track type work machine includes providing the first track roller assembly with a roller frame, a drive sprocket, at least one idler rotatably connected to said roller frame, a carrier roller rotatably connected to an upper portion of said roller frame, a track chain entrained around the drive sprocket, the at least one idler, and the carrier roller, the track chain defining a catenary hang. Providing a second track roller assembly with a roller frame, a drive sprocket, at least one idle rotatably connected to said roller frame, a carrier roller rotatably connected to an upper portion of the roller frame, a track chain entrained around the drive sprocket, the at least one idler, and the carrier roller, the track chain defining a catenary hang. Varying the catenary hang of a one of a first roller assembly and a second roller assembly.

DETAILED DESCRIPTION

Figure 1:
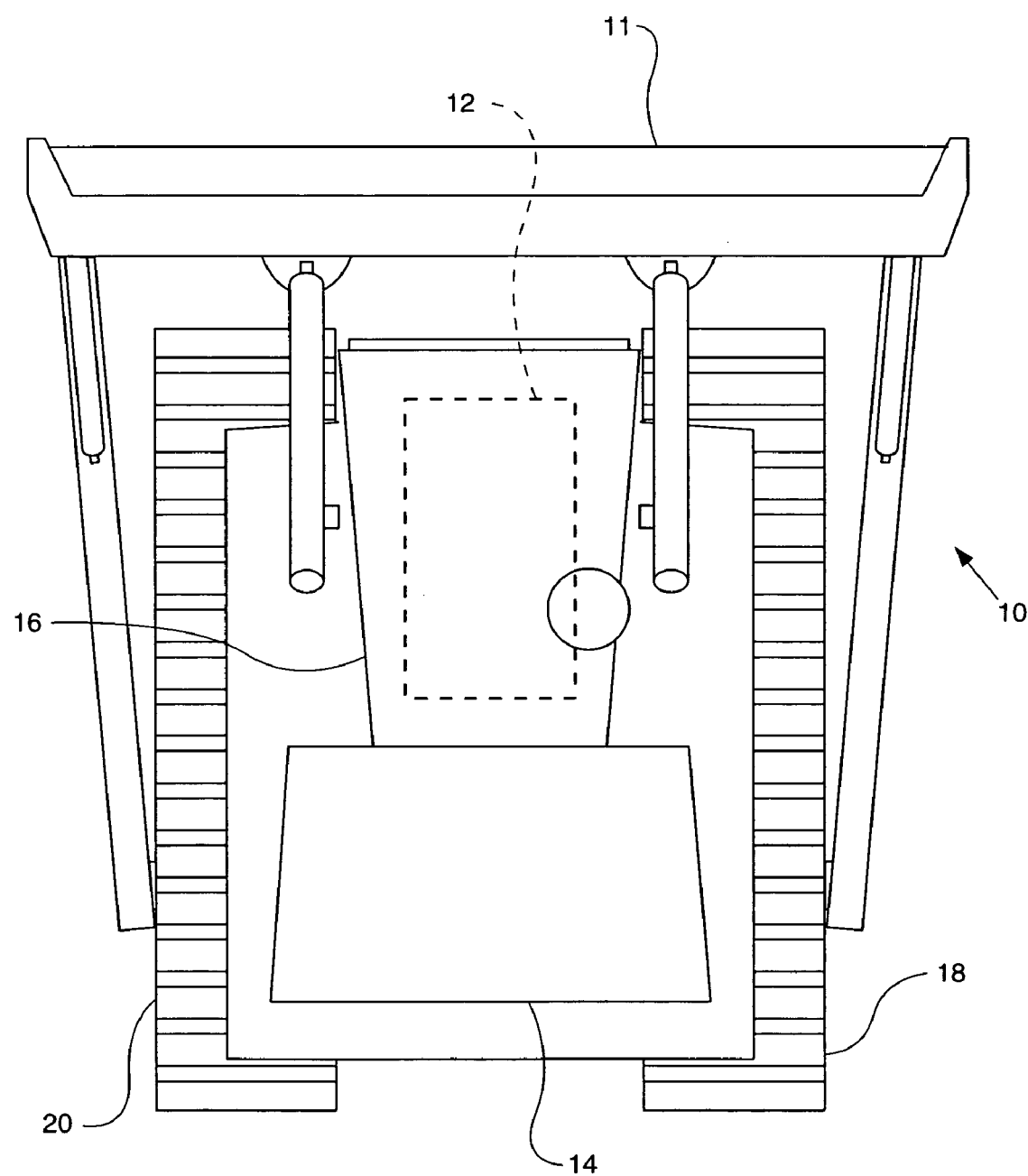
FIG. 1 is a plan view of a work machine embodying the present invention.

Referring to the drawings, specifically FIG. 1, a work machine 10 is shown, which is shown as being a track type dozer. However it is to be understood that the work machine could be a track type dozer, a track type loader, an excavator or any other work machine employing endless tracks as the means of supporting and propelling the machine. The work machine 10 includes a work implement 11 such as a dozer blade, an engine 12, an operator's station 14 and a mainframe 16. The mainframe 16 supports first and second track roller assemblies 18,20 one each being positioned on opposite sides of the main frame 16. First and second roller assemblies 18,20 are substantially and functionally similar and, therefore, only one track roller assembly 18 will be described in detail with similar components of the second roller frame being referenced with like element numbers represented by a prime designation.

Figure 2:
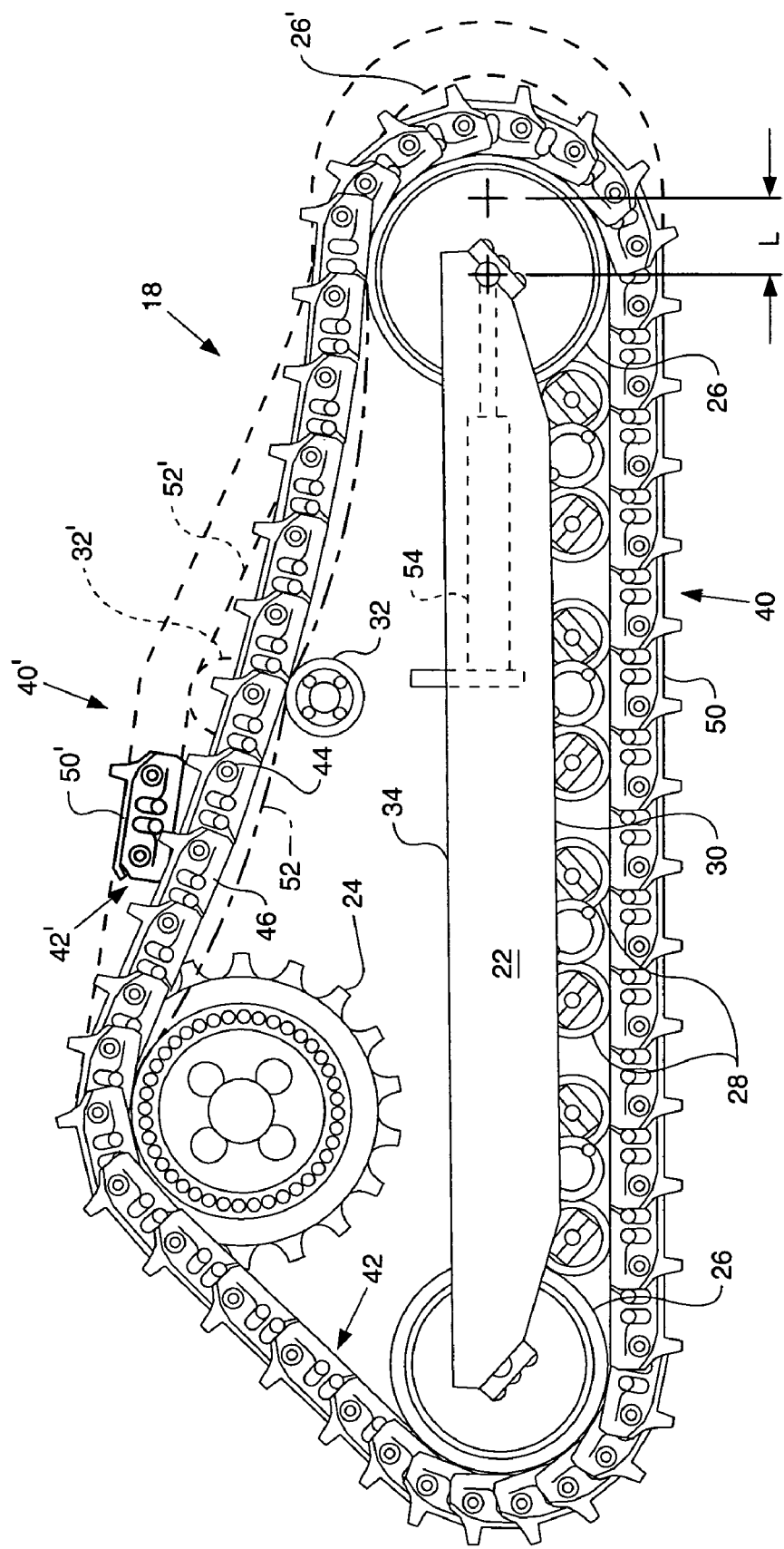
FIG. 2 is a side elevational view of a work machine showing multiple embodiments of the present invention.
Figure 3:
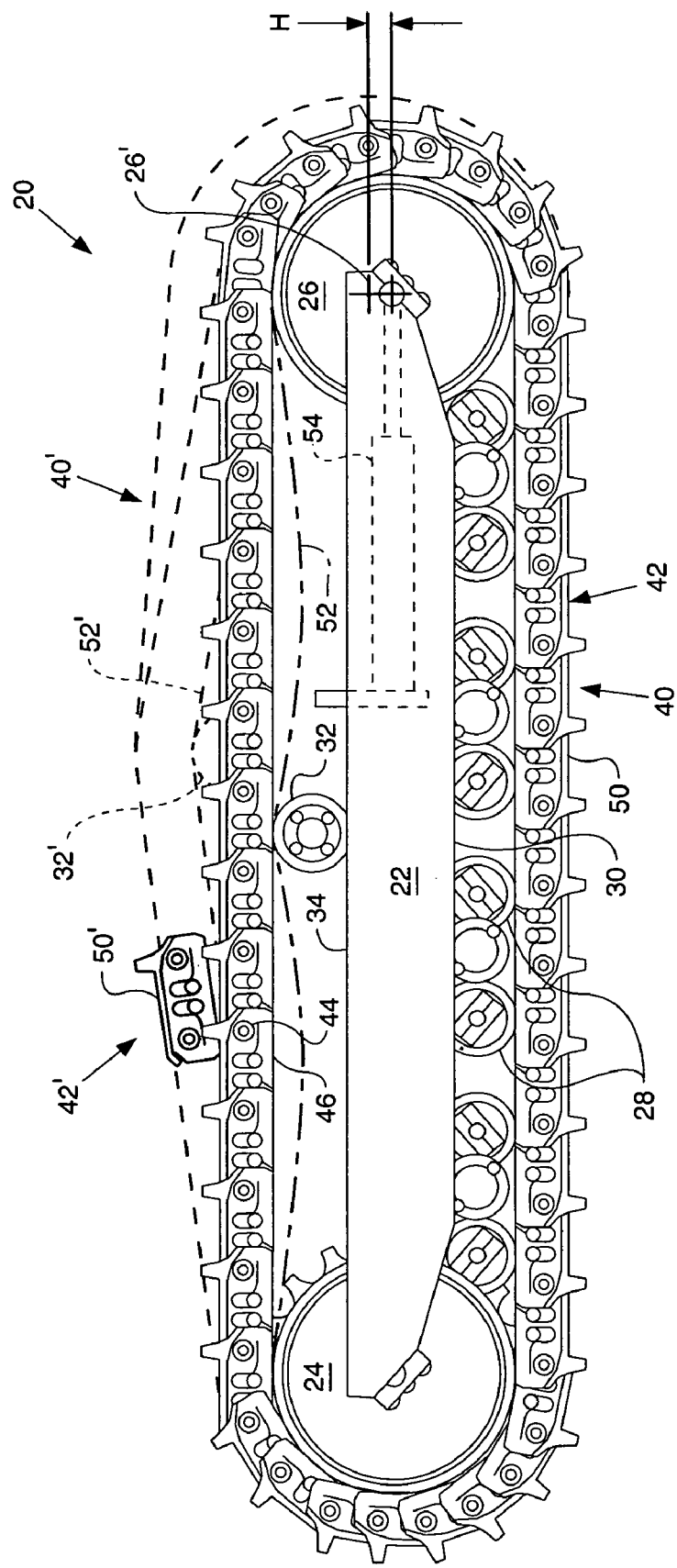
FIG. 3 is a side elevational view of a work machine showing additional embodiments of the present invention.

The first track roller assembly 18 includes a roller frame 22. The roller frame 22 includes a drive sprocket 24 operably rotatably mounted at one end as shown in FIG. 3 and operably rotatably mounted to the main frame as shown in FIG. 2. Rotatably mounted at the other end of the roller frame 22 is at least one idler assembly 26 as seen in both FIGS. 2 and 3. A plurality of supporting mid-rollers 28 are connected to a bottom portion 30 of the roller frame 22 and a carrier roller 32 is connected to an upper portion 34 of the roller frame 22. A track chain assembly 40 is entrained around the drive sprocket 24, the at least one idler assembly 26, the supporting mid-rollers 28 and the carrier roller 32.

The track chain assembly 40, only a portion of which is shown, includes a plurality of subassemblies 42. Each subassembly 40 includes a pin and bushing or cartridge assembly 44, a pair of spaced apart or inner and outer links 46 and a track shoe 50 connected to the spaced apart track links 46. A number of subassemblies 42 are mechanically coupled to adjacent subassemblies 42 so that when an appropriate number of these subassemblies 42 are connected together, the track chain assembly 40 is formed. The track chain assembly 40 has a predetermined length for a given application or track roller assembly 20.

As shown in FIGS. 2 and 3 each track chain assembly 40 defines a catenary hang 52. The catenary hang 52 is the droop or sag of the track chain assembly 40 caused by the weight of the track chain assembly 40 and/or the tension provided by a track tension arrangement 54. Track tension arrangement 54 may be any of a number of known arrangements such as hydraulic cylinders, grease cylinders, springs or the like. The catenary hang 52 occurs in the track chain assembly 40 from the drive sprocket 24 to the carrier roller 32 and from the carrier roller 32 to the at least one idler assembly 26. Shown in both FIGS. 2 and 3 the catenary hang 52 is the difference between the theoretically perfectly straight track chain assembly 40 and the actual sag designated by the track chain assembly 40 shown in phantom.

Several embodiments of a vibration reducing apparatus 56 are illustrated in FIGS. 2 and 3. Specifically, the vibration reducing apparatus 56 in general is created by varying the catenary hang 52 of the first track roller assembly 18 from the catenary hang 52' of and the second track roller assembly 20, which can be obtained by a variety of different means and methods.

One embodiment shown in FIG. 2 is to move the carrier roller 32' of the second roller assembly 20 to a position above or below the position of the carrier roller 32 of the first roller assembly 18, the elevated position of carrier roller 32' being shown in FIG. 2. By raising carrier roller 32' the catenary hang 52' for the second roller assembly 20 would be less than the catenary hang 52 of the first roller assembly 18. Lowering carrier roller 32' would cause a greater amount of catenary hang 52' for the second roller assembly 20. Another embodiment would be to move the at least one idler assembly 32' of the second roller assembly 20 either forward or rearward of the at least one idler assembly 32 of the first roller assembly 18 by an exaggerated distance designated by "L" seen in FIG. 2. To achieve the movement of the at least one idler assembly 26' the distance "L" the force exerted by tension arrangement 54' could be increase or decreased by a predetermined amount so as to change the length of the track chain assembly 40' supported between the carrier roller 32' and the at least one idler assembly 26'. Thus varying the catenary hang 52, 52' of the track chain assembly 40, 40' between the first and second track roller assembly 18,20. Movement of the idler assembly 26' could alternately be achieved by lengthening or shortening the track roller frame 22' by the distance "L". Additionally, an extra subassembly 42' could be added to or removed from the track chain assembly 40' thus allow the at least one idler assembly 26' to move forward or rearward by distance "L".

FIG. 3 details further embodiments of the vibration reducing apparatus 56. In this embodiment the carrier roller 32' of the second roller assembly 20 would be moved either forward or rearward of the carrier roller 32 of the first roller assembly 18. Thus changing the length of the track chain assembly 42' supported between the drive sprocket 24' and the carrier roller 32' and the length of the track chain 42' supported between the carrier roller 32' and the at least one idler assembly 26'. Another embodiment shown in FIG. 3 would move the centerline of the at least one idler assembly 26, 26' upward a generally vertical distance designated by "H". This would change the catenary hang 52, 52' changing the support point from the carrier roller 32, 32' and the at least one idler assembly 26, 26'. This could be achieved by physically moving the mounting location for the at least one idler assembly 26, 26' to a different location or by increasing or decreasing the diameter of the at least one idler assembly 26, 26'. Conversely, the diameter of either of the drive sprockets 24, 24' could be varied and provide a similar effect.

INDUSTRIAL APPLICABILITY

During operation of the work machine 10 if the catenary hang 52, 52' of the track chain assembly 40, 40' are identical vibrations occur due to the motion of the catenary hang 52, 52' of the track chain assembly 40, 40' moving in phase with one another. With the catenary movement being in phase causes vibrations that are additive in effect and causes the work implement 11 to bounce. The bounce of work implement 11 causes ripples or scallops in the terrain being worked while performing fine dozing operations.

By changing the catenary hang 52,52' on either the first or second roller assembly 18,20 by any of the embodiments described above changes either the length of track chain assembly supported between the drive sprocket 24, 24' and the carrier roller 32, 32' and the length supported between the carrier roller 32, 32' and the at least one idler assembly 26, 26'. With the catenary hang 52,52' being different between the first roller assembly 18 and the second roller assembly 20 the catenary movement of the track chain assembly 40, 40' is placed out of phase with one another. Having the track chain assemblies 40, 40' out of phase causes a canceling effect in the catenary movement of the track chain assemblies 40, 40' between the first and second track roller assemblies improving the fine dozing effectiveness of the work machine 10.

Other aspects, objects and advantages of this invention can be obtained from a study of the drawings, the disclosure and the appended claims.

What is claimed is:

1. An undercarriage arrangement comprising:
    a first track roller assembly including;
        a roller frame;
        a drive sprocket;
        at least one idler assembly rotatably connected to said roller frame;
        a carrier roller rotatably connected to an upper portion of said roller frame;
        a track chain entrained around said drive sprocket, said at least one idler, and said carrier roller, said track chain defining a catenary hang;
    a second track roller assembly including;
        a roller frame;
        a drive sprocket;
        at least one idler assembly rotatably connected to said roller frame;
        a carrier roller rotatably connected to an upper portion of said roller frame;
        a track chain entrained around said drive sprocket, said at least one idler, and said carrier roller, said track chain defining a catenary hang; and
    wherein said catenary hang of said track chain of said first track roller assembly being different than said catenary hang of said track chain of said second roller assembly so that during operation the catenary movement of said track chain of said first track roller assembly is placed out of phase with the catenary movement of said track chain of said second track roller assembly thereby canceling the vibration effects of the catenary movement.

2. The undercarriage arrangement of claim 1 wherein the difference in said catenary hang from said first roller assembly to said second roller assembly is produced by positioning a one of said carrier roller of said first roller assembly and said carrier roller of said second roller assembly at a position different than said one of said carrier roller said first roller assembly and said carrier roller of said second roller assembly.

3. The undercarriage arrangement of claim 2 wherein moving of a one of said carrier roller of said first roller assembly and said carrier roller of said second roller assembly to a one of an upper or lower position.

4. The undercarriage arrangement of claim 1 wherein the difference in said catenary hang from said first roller assembly to said second roller assembly is produced by moving a one of said at least one idler assembly of said first roller assembly and a one of said at least one idler assembly of said second roller assembly.

5. The undercarriage arrangement of claim 4 wherein moving a one of said at least one idler assembly of said first roller assembly and a one of said at least one idler assembly of said second roller assembly to a one of a forward or a rearward position.

6. The undercarriage arrangement of claim 5 wherein moving a one of said at least one idler assembly of said first roller assembly and a one of said at least one idler assembly of said second roller assembly is produced by increasing or decreasing the length of a one of said roller frame of said first roller assembly and a one of said roller frame of said second roller assembly.

7. The undercarriage arrangement of claim 1 wherein the difference in said catenary hang from said first roller assembly to said second roller assembly is produced by increasing or decreasing the force exerted by a one of a tension arrangement of said first roller assembly and a one of a tension arrangement of said second roller assembly.

8. The undercarriage arrangement of claim 1 wherein moving a one of said at least one idler assembly of said first roller assembly and a one of said at least one idler assembly of said second roller assembly is produced by increasing or decreasing the length of a one of said track chain assembly of said first roller assembly and a one of said track chain assembly of said second roller assembly.

9. The undercarriage arrangement of claim 1 wherein the difference in said catenary hang from said first roller assembly to said second roller assembly is produced by increasing or decreasing the diameter of a one of said at least one idler assembly of said first roller assembly and a one of said at least one idler assembly of said second roller assembly.

10. The undercarriage arrangement of claim 1 wherein the difference in said catenary hang from said first roller assembly to said second roller assembly is produced by increasing or decreasing the diameter of a one of said drive sprocket of said first roller assembly and a one of said drive sprocket of said second roller assembly.

11. A method of reducing vibrational effects of a first and a second track roller assembly of a track type work machine comprising:
providing said first track roller assembly with a roller frame, a drive sprocket, at least one idler rotatably connected to said roller frame, a carrier roller rotatably connected to an upper portion of said roller frame, a track chain entrained around said drive sprocket, said at least one idler, and said carrier roller, said track chain defining a catenary hang;

providing a second track roller assembly with a roller frame, a drive sprocket, at least one idler rotatably connected to said roller frame, a carrier roller rotatably connected to an upper portion of said roller frame, a track chain entrained around said drive sprocket, said at least one idler, and said carrier roller, said track chain defining a catenary hang; and varying said catenary hang of a one of a track chain of said first roller assembly and a track chain of said second roller assembly so that during operation the catenary movement of said track chain of said first track roller assembly is placed out of phase with the catenary movement of said track chain of said second track roller assembly thereby canceling the vibration effects of the catenary movement.

12. The method of reducing vibrational effects of a first and a second track roller assembly of a track type work machine of claim 11 wherein varying said catenary hang of a one of a first roller assembly and a second roller assembly includes lengthening a track roller frame of a one of a first roller assembly and a second roller assembly.

13. The method of reducing vibrational effects of a first and a second track roller assembly of a track type work machine of claim 11 wherein varying said catenary hang of a one of a first roller assembly and a second roller assembly includes repositioning a carrier roller of a one of a first roller assembly and a second roller assembly at a position different than said one of said carrier roller said first roller assembly and said carrier roller of said second roller assembly.

14. The method of reducing vibrational effects of a first and a second track roller assembly of a track type work machine of claim 11 wherein varying said catenary hang of a one of a first roller assembly and a second roller assembly includes a one of a increasing and a decreasing the tension of a track chain assembly of a one of a first roller assembly and a second roller assembly.

15. The method of reducing vibrational effects of a first and a second track roller assembly of a track type work machine of claim 11 wherein varying said catenary hang of a one of a first roller assembly and a second roller assembly includes changing a diameter of a one of a drive sprocket and a one of at least one idler assembly of a one of a first roller assembly and a second roller assembly.

* * * * *